United States Patent

Krause et al.

Patent Number: 5,147,082
Date of Patent: Sep. 15, 1992

[54] TOOL CONFIGURATION FOR ULTRASONIC WELDING

[75] Inventors: Ralf D. Krause, Nürnberg; Helmut Moll, Erlangen, both of Fed. Rep. of Germany

[73] Assignee: Siemens Aktiengesellschaft, Berlin & Munich, Fed. Rep. of Germany

[21] Appl. No.: 460,909

[22] PCT Filed: Jul. 28, 1988

[86] PCT No.: PCT/EP88/00686
§ 371 Date: Feb. 13, 1990
§ 102(e) Date: Feb. 13, 1990

[87] PCT Pub. No.: WO89/01384
PCT Pub. Date: Feb. 23, 1989

[30] Foreign Application Priority Data

Aug. 17, 1987 [DE] Fed. Rep. of Germany ....... 3727406

[51] Int. Cl.$^5$ ............................................. B23K 1/06
[52] U.S. Cl. ........................................ 228/1.1; 228/110
[58] Field of Search ................... 228/1.1, 110, 44.7, 228/54, 4.5, 179; 76/DIG. 12

[56] References Cited

U.S. PATENT DOCUMENTS

| | | | |
|---|---|---|---|
| 3,356,473 | 12/1967 | Hull et al. | 228/124 R |
| 3,627,192 | 12/1971 | Killingsworth | 228/54 |
| 3,695,500 | 10/1972 | Walraven et al. | 228/1 |
| 4,225,322 | 9/1980 | Knemeyer | 228/124 |
| 4,629,373 | 12/1986 | Hall | 76/DIG. 12 |
| 4,667,867 | 5/1987 | Dobbs et al. | 228/44.7 |
| 4,767,050 | 8/1988 | Flood et al. | 228/122 |
| 4,890,782 | 1/1990 | Nakai | 228/112 |

FOREIGN PATENT DOCUMENTS

| | | | |
|---|---|---|---|
| 0116010 | 8/1984 | European Pat. Off. | |
| 0230233 | 7/1987 | European Pat. Off. | 228/122 |
| 1185041 | 1/1965 | Fed. Rep. of Germany | |
| 2028878 | 10/1970 | France | |
| 0037563 | 9/1973 | Japan | 228/44.7 |
| 0158335 | 7/1987 | Japan | 228/4.5 |
| 0073532 | 4/1988 | Japan | 228/4.5 |
| 0948063 | 5/1987 | U.S.S.R. | 228/1.1 |
| 2165178 | 4/1986 | United Kingdom | |

OTHER PUBLICATIONS

IEEE Transactions on Components, Hybrids, and Manufacturing Technology, vol. Chmt—2, No. 3, pp. 283-288, Sep. 1979.

Western Electric, "Multi directional Ultrasonic Wire Bonding Tip", Avedissian, Technical Digest No. 20, pp. 7,8, Oct. 1970.

*Primary Examiner*—Richard K. Seidel
*Assistant Examiner*—James Miner
*Attorney, Agent, or Firm*—Kenyon & Kenyon

[57] ABSTRACT

Known tool configurations for ultrasonic welding are comprised of a sonotrode as an active tool and an anvil as a work fixture for the workpieces. According to the invention, the sonotrode (1, 21, 30, 40, 50) and/or anvil (2, 22) are provided with synthetic hard material on their working surfaces (6, 9, 36, 46) through which the ultrasound is injected into the workpieces (3, 4, 23, 24) to be welded together. This synthetic hard material defines a new working surface (6a, 9a, 26a, 46a, 56a). Polycrystalline diamond, polycrystalline boron nitride, or also cubic-crystalline boron nitride come under consideration as synthetic hard materials.

12 Claims, 1 Drawing Sheet

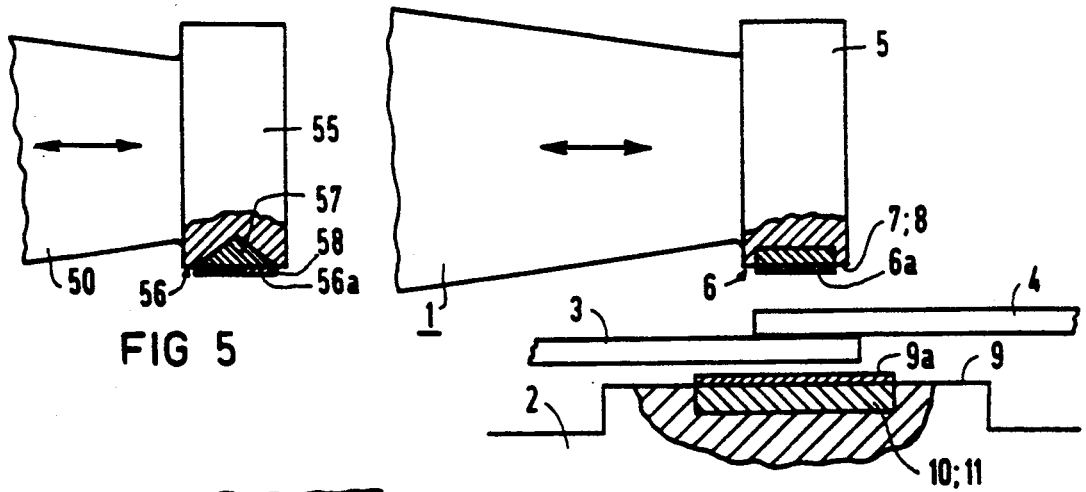
FIG 5
FIG 1
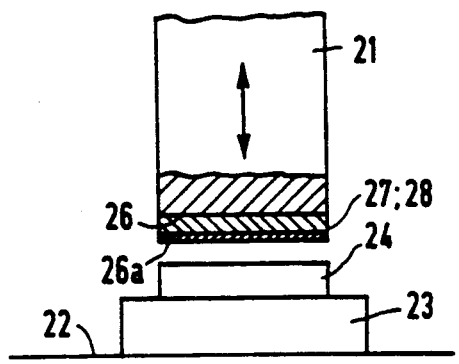
FIG 2
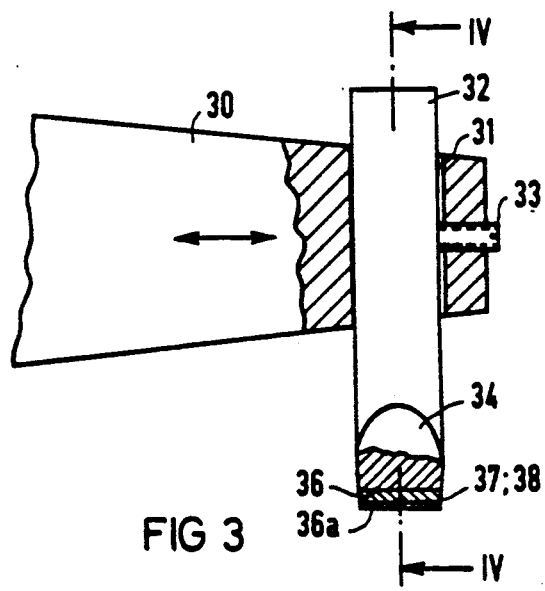
FIG 3
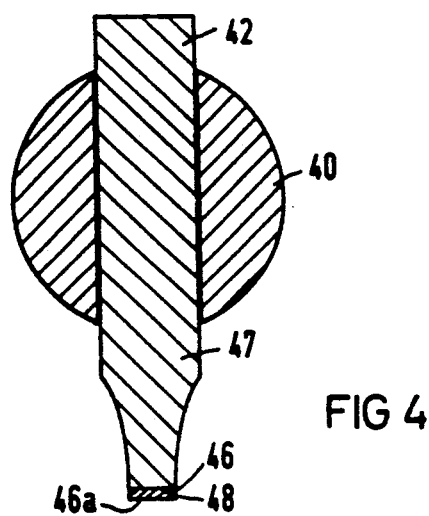
FIG 4

TOOL CONFIGURATION FOR ULTRASONIC WELDING

The invention relates to a tool configuration for ultrasonic welding consisting of a sonotrode as an active tool and an anvil as a work fixture for the workpieces. Such a tool configuration is meant to be used in ultrasonic plastic welding as well as in metal welding and particularly also in the bonding of thin wires.

The vibrational amplitude resulting from the roughness of the working surface of the sonotrode is passed on to the workpiece situated above. This is especially true in the ultrasonic welding of metals. A reproducible vibrational initiation is a basic requirement for a uniform welding quality. Just as important is the fixing in position of the part assigned to the anvil. In this case as well, the part to be joined is often retained by the surface roughness of the anvil. To obtain this roughness, the latter is provided with cross grooves or so-called waffle patterns or the like using sandblasting or eroding methods. With such constructional measures, one can ensure that the reproducible relative movement necessary for ultrasonic welding arises as a friction movement in the surface to be joined.

The rough working surfaces of the machining insert wear away very quickly on the sonotrode and on the anvil, particularly when hard metals are ultrasonically welded. If very large peak-to-valley heights are selected to attain a longer tool life, then heavy impressions will develop on the parts to be joined, for example, when the so-called waffle pattern is used. Besides the unsightly visual effect such impressions cause, they can also adversely affect the quality of the workpieces leading to damages such as low shearing resistance or peel strength, or they can also cause the parts to split.

On the other hand, when the roughness is too shallow, as is especially the case in the welding of parts made of aluminum or its alloys, material remains stuck to the sonotrode and the anvil. As a result, the bond can be partially or completely torn apart again when the welding press is opened after the ultrasonic welding operation.

In the case of ultrasonic welding installations in the prior art, the working or bearing surfaces of the tools must therefore be machined at regular intervals or else be provided from the start with replaceable pins.

Therefore, the object of the invention is to produce a tool configuration for ultrasonic welding, in which the working surfaces have improved resistance to wear.

The objective is solved according to the invention in that at least the sonotrode is provided with synthetic hard material on its working surfaces, through which the ultrasound is injected into the workpieces to be welded together. Preferably, the anvil is also provided with such a synthetic hard material on its working surfaces.

Polycrystalline diamond, in particular, polycrystalline boron nitride, or also cubic-crystalline boron nitride, come under consideration as synthetic hard materials within the scope of the invention. These types of synthetic hard materials are already known in the coating of machining tools. Compared to the usual hard metals, they are distinguished by their improved hardness properties. However, this is inevitably linked to greater brittleness and susceptibility to breaking, so that as such one cannot expect them to be used for ultrasonic tools.

It was able to be shown within the scope of the invention, however, that the polycrystalline diamond, for example, in spite of its brittleness, withstands the ultrasonic vibrations, and thus is suited for application in ultrasonic tool configurations.

Further details and advantages of the invention are revealed in light of the drawings in the following description of the figures of exemplified embodiments, in connection with the further sub-claims.

The figures depict in rough schematic representation respectively:

FIG. 1 a tool configuration for ultrasonic metal welding;

FIG. 2 a tool configuration for ultrasonic plastic welding or riveting;

FIG. 3 a sonotrode head with bonding cotter to bond thin wires and

FIG. 4 a variant of the bonding cotter according to FIG. 3 in a perpendicular direction of view;

FIG. 5 a variant of the insert of the tool configuration according to FIG. 1.

The figures are not drawn on a strict scale to one another. They are explained in the following, in part collectively.

In FIG. 1, 1 represents a sonotrode with a vibration direction which is indicated by the double arrow. Assigned to this sonotrode 1 is an anvil 2. Sketched between the sonotrode 1 and the anvil 2 are two metallic workpiece parts 3 and 4 to be welded together. Such ultrasonic tool configurations are already known from the prior art in many forms.

The sonotrode 1 has proximally a sonotrode head 5, which on its working surface 6 shows a frictionally fitted insert 7 or 8. Accordingly, an insert 10 or 11 is mounted in the working surface 9 of the anvil 2. The design and function of these inserts, which according to the invention act as new working surfaces 6a or 9a, are explained more closely further on in their total context.

In FIG. 2, the sonotrode of a tool configuration for the ultrasonic welding or riveting of plastic parts is designated with 21. It lies with its working surface 26 opposite the bearing surface 22 of an anvil. Two plastic parts 23 and 24 to be joined are sketched between both tool parts.

In the welding or riveting of plastic parts, the vibration direction of the sonotrode lies in the perpendicular direction indicated by the double arrow. Usually the welding forces are smaller here. An attachment [part set on] 27 or 28 is applied frictionally and in a form fitting matter on to the original working surface 26 of the sonotrode 21. The function of this attachment 27 or 28 corresponds to that of the inserts 7, 8 or 10, 11 of FIG. 1. In this manner, a new working surface 26a is defined.

In FIG. 3, 30 represents the proximal part of a sonotrode. To bond thin wires, a so-called bonding cotter 32 is introduced in the perpendicular direction into a borehole 31 of the sonotrode 30 and fixed in position by an adjusting screw 33. The bonding cotter 32 can be tapered toward its working area—perpendicularly to the drawing plane, to increase the effective ultrasonic amplitude. The latter [tapered area] is indicated by the parabola line 34. An attachment 37 or 38, which corresponds to the inserts 7, 8 or 10, 11 of FIG. 1 and to the attachment 27, 28 of FIG. 2, is superimposed on the original working surface 26 of the bonding cotter 32. The inserts 7, 8 and 10, 11 of FIG. 1 as well as the attachments 27, 28 of FIG. 2 and 37, 38 of FIG. 3 consist respectively of a base with soldering capability, that is the area 7, 10, 27 or 37, and of a layer of synthetic hard material 8, 11, 28 or 38 of, for example, 0.7 mm, as available commercially. The base can thereby be permanently joined to the respective tool by soldering.

As a synthetic material, polycrystalline diamond is selected, which is known per se from prior art. Polycrystalline diamond is produced under a high pressure and at a high temperature as a homogeneous composite of a nearly 100% concentration of synthetic diamond monohydrate crystals and combined with a hard metal carrier matrix. It is the hard metal base which makes this material capable of being soldered. As is known, polycrystalline diamond has the distinction of being particularly hard, highly brittle, and susceptible to breaking.

The polycrystalline diamond was joined over the hard metal matrix, through hard-soldering, with the previous working surface of a sonotrode used for welding metal, and roughened. Contrary to what one would expect, the brittle polycrystalline diamond withstood the ultrasonic vibrations with a frequency of between 20 and 60 kHz and amplitudes of up to 50 $\mu$m. Within the scope of one processing, it was shown that in the ultrasonic welding of copper wires, the service life of the new tool configurations lies by two orders of magnitude above that of the known tool configuration with conventional hard metal coatings.

In addition to welding on thin copper wires, such a tool configuration can be used, for example, to weld on aluminum strips for electrolytic capacitors. In these types of welding tasks, the problem usually occurs that the materials will adhere well, sucas aluminum or aluminum alloys, stick to the anvil and/or to the working surfaces of the sonotrode. By applying polycrystalline diamond to the anvil, the problem of king was able to be completely solved.

In addition to polycrystalline diamond, polycrystalline boron nitride and cubic-crystalline boron nitride can also be used for similar tasks. It is particularly advantageous to apply the latter, when one needs to eliminate any carbon influence.

An exemplified embodiment is specially shown in FIG. 4, where the bonding cotter 42 of an ultrasonic sonotrode 40 is comprised on the whole of a hard metal 47 as a carrier matrix, on which a synthetic hard material layer 48 is applied toward the working surface 46. This simplifies production, since the soldering operation is eliminated and the working surface 46a is defined directly.

It follows from FIG. 5 that an insert is frictionally mounted in a sonotrode head 55 of a sonotrode 50. In the case of this insert, synthetic hard material 58 is situated on a base 57 having an angular form to the rear. This insert 57, 58 is able to be better anchored in the sonotrode head. On the one hand, the boundary surface to be soldered is increased on the whole, on the other hand, the shearing forces acting on the boundary surface during the ultrasonic welding are replaced by alternating compressive and tensile stresses.

An insert for the anvil according to FIG. 1 can have a base with an angular form, in complete accordance with FIG. 5.

In the case of the individually described examples, it is always possible to provide a comparatively thick layer of synthetic hard material because of the separate insert. Here lies a fundamental difference between the described examples and the known coatings which usually are within the range and produced, for example, using PVD and/or CVD processes. It has been shown that such known layers are not suited for ultrasonic tools, due to the great amount of wear that a sonotrode vibrating in the horizontal direction is subject to. On the other hand, layers of any desired thickness are able to be produced with synthetic hard materials having a fine crystalline form. In the case of such polycrystalline layers with thicknesses from about 100 $\mu$m (>0.1 mm), the properties of a compact solid result. For example, at a thickness of 0.5 mm, altogether isotropic conditions prevail in inserts made of a commercially available, hard metal base with polycrystalline diamond, due to the multitude of individual monohydrate crystals arranged irregularly. This also makes it possible for the surface to be finished mechanically. Thus at adequate thicknesses, the synthetic hard materials are equal [in strength] to the high stresses which occur in ultrasonic welding.

Since in the exemplified embodiments described, the thickness of the synthetic hard material layer is always comparatively large, for example 0.7 mm, it generally lies above the level of roughness required for the working surface. Such a roughness can be additionally introduced using appropriate machining processes, particularly eroding methods. Over and above that, the surface of the hard material layer can be provided with a contour, for example a grooved structure or a so-called waffle pattern.

We claim:

1. In a tool configuration for ultrasonic welding comprising a sonotrode as an active tool and an anvil as a work fixture for workpieces wherein at least the sonotrode is provided with a wear-reducing layer on its working surface through which the ultrasound is injected into the workpieces to be welded together, the improvement comprising the wear-reducing layer is polycrystalline diamond.

2. The tool configuration according to claim 1, wherein the anvil has a wear-reducing layer of polycrystalline diamond on its working surface.

3. The tool configuration according to claim 1 wherein the polycrystalline diamond defines a homogeneous composite material of a nearly 100% concentration on a hard metal carrier matrix, which forms a base capable of being soldered.

4. The tool configuration according to claim 3 wherein together with the composite material, the base forms a frictionally connected insert in the working surface of at least one of the sonotrode or of the anvil and that a new working surface is formed by the polycrystalline diamond.

5. The tool configuration according to claim 4 wherein the base of the insert frictionally connected to the sonotrode has an angular design.

6. The tool configuration according to claim 3 wherein together with the composite material, the base forms an application connected frictionally and in a form-fitting manner on the working surface of at least one of the sonotrode or of the anvil and that a new working surface is formed by the polycrystalline diamond.

7. The tool configuration according to claim 1 wherein the thickness of the layer of polycrystalline diamond is larger than the level of roughness required for the working surface.

8. The tool configuration according to claim 1 wherein the layer of polycrystalline diamond has a specified surface contour selected from the group consisting of a grooved structure and a waffle pattern.

9. The tool configuration according to claim 1 wherein the sonotrode has a bonding cotter to bond thin wires and the bonding cotter has an insert or application made of composite material with a hard metal carrier matrix and with the layer of polycrystalline diamond.

10. The tool configuration according to claim 1 wherein the sonotrode has a bonding cotter to bond thin wires and the bonding cotter as a whole forms a carrier matrix for the layer of polycrystalline diamond with a working surface.

11. The tool configuration according to claim 1 wherein the layer of polycrystalline diamond is thicker than 0.1 mm.

12. The tool configuration according to claim 1 wherein the layer of polycrystalline diamond is thicker than 0.5 mm.

* * * * *